United States Patent
Shino et al.

(10) Patent No.: US 11,441,452 B2
(45) Date of Patent: Sep. 13, 2022

(54) HEAT EXCHANGE SYSTEM, COOLING SYSTEM AND COOLING METHOD OF GAS TURBINE, AND GAS TURBINE SYSTEM

(71) Applicant: Mitsubishi Hitachi Power Systems, Ltd., Kanagawa (JP)

(72) Inventors: Naoki Shino, Yokohama (JP); Yukimasa Nakamoto, Yokohama (JP); Isamu Matsumi, Yokohama (JP); Atsushi Kubota, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 537 days.

(21) Appl. No.: 16/337,995

(22) PCT Filed: Sep. 4, 2017

(86) PCT No.: PCT/JP2017/031726
§ 371 (c)(1),
(2) Date: Mar. 29, 2019

(87) PCT Pub. No.: WO2018/096757
PCT Pub. Date: May 31, 2018

(65) Prior Publication Data
US 2019/0234243 A1    Aug. 1, 2019

(30) Foreign Application Priority Data

Nov. 25, 2016 (JP) .............................. JP2016-228779

(51) Int. Cl.
*F01K 23/10* (2006.01)
*F02C 7/141* (2006.01)
(Continued)

(52) U.S. Cl.
CPC .............. *F01K 23/10* (2013.01); *F02C 3/04* (2013.01); *F02C 6/18* (2013.01); *F02C 7/141* (2013.01);
(Continued)

(58) Field of Classification Search
None
See application file for complete search history.

(56) References Cited

U.S. PATENT DOCUMENTS 5,758,485 A * 6/1998 Frutschi ................ F01D 25/007
                                                    415/179
6,233,940 B1 * 5/2001 Uji ........................ F01K 21/047
                                                    60/39.01
(Continued)

FOREIGN PATENT DOCUMENTS

| CN | 1148662 | 4/1997 |
|---|---|---|
| CN | 1507534 | 6/2004 |

(Continued)

OTHER PUBLICATIONS

International Search Report dated Nov. 14, 2017 in International (PCT) Application No. PCT/JP2017/031726, with English-language translation.
(Continued)

*Primary Examiner* — Todd E Manahan
*Assistant Examiner* — Sean V Meiller
(74) *Attorney, Agent, or Firm* — Wenderoth, Lind & Ponack, L.L.P.

(57) ABSTRACT

A heat exchange system includes: a gas line through which a gas to be cooled flows; a first heat exchanger disposed in the gas line and configured to cool the gas through heat exchange with a refrigerant; a refrigerant introduction line for introducing the refrigerant into the first heat exchanger; a refrigerant discharge line for discharging the refrigerant
(Continued)

after cooling the gas from the first heat exchanger; a recirculation line for recirculating at least a part of the refrigerant flowing through the refrigerant discharge line into the refrigerant introduction line; and a flow-rate adjustment unit for adjusting a flow rate of the refrigerant flowing through the recirculation line so that a temperature of the refrigerant introduced into the first heat exchanger from the refrigerant introduction line is not lower than a threshold.

12 Claims, 2 Drawing Sheets

(51) Int. Cl.
    *F02C 3/04*     (2006.01)
    *F02C 7/18*     (2006.01)
    *F02C 6/18*     (2006.01)

(52) U.S. Cl.
    CPC .......... *F02C 7/18* (2013.01); *F05D 2260/213* (2013.01); *Y02E 20/16* (2013.01)

(56) References Cited

U.S. PATENT DOCUMENTS

| | | | | |
|---|---|---|---|---|
| 6,318,089 | B1* | 11/2001 | Hiraga | F01D 25/32 165/297 |
| 2004/0088995 | A1 | 5/2004 | Reissig | |
| 2004/0172947 | A1* | 9/2004 | Takahama | F02C 7/185 60/772 |
| 2013/0115114 | A1 | 5/2013 | Bryant et al. | |
| 2014/0020398 | A1 | 1/2014 | Mittricker et al. | |
| 2015/0107258 | A1* | 4/2015 | Rofa | F02C 7/1435 60/775 |
| 2015/0322822 | A1* | 11/2015 | Khandwavla | F02C 9/40 60/39.19 |
| 2016/0341497 | A1 | 11/2016 | Kitaguchi | |
| 2017/0152765 | A1* | 6/2017 | Uechi | F01K 25/10 |
| 2018/0045080 | A1* | 2/2018 | Uechi | F01K 23/10 |

FOREIGN PATENT DOCUMENTS

| | | |
|---|---|---|
| CN | 1571879 | 1/2005 |
| CN | 103091367 | 5/2013 |
| CN | 103459815 | 12/2013 |
| CN | 105899907 | 8/2016 |
| CN | 106133279 | 11/2016 |
| DE | 195 31 562 | 3/1997 |
| GB | 645906 | 11/1950 |
| JP | 9-119321 | 5/1997 |
| JP | 9-195797 | 7/1997 |
| JP | 11-173161 | 6/1999 |
| JP | 2001-59426 | 3/2001 |
| JP | 2003-201862 | 7/2003 |
| JP | 2015-152264 | 8/2015 |
| JP | 2015-183590 | 10/2015 |
| JP | 2015-183597 | 10/2015 |
| JP | 2015183590 A * | 10/2015 .............. F02C 7/185 |
| JP | 2015183596 A * | 10/2015 |
| WO | 2011/076973 | 6/2011 |

OTHER PUBLICATIONS

International Preliminary Report on Patentability dated Jun. 6, 2019 in International (PCT) Application No. PCT/JP2017/031726.
Office Action dated Feb. 2, 2021 in corresponding CN Application No. 201780066089.3.
Office Action dated Apr. 29, 2020 in corresponding Korean Patent Application No. 10-2019-7011536 with English-language translation.
Office Action dated Apr. 28, 2020 in corresponding Japanese Patent Application No. 2016-228779 with English-language translation.
Office Action dated Jun. 4, 2020 in corresponding German Application No. 11 2017 005 972.0 with English-language translation.

* cited by examiner

HEAT EXCHANGE SYSTEM, COOLING SYSTEM AND COOLING METHOD OF GAS TURBINE, AND GAS TURBINE SYSTEM

TECHNICAL FIELD

The present disclosure relates to a heat exchange system and an operation method thereof, a cooling system and a cooling method of a gas turbine, and a gas turbine system.

BACKGROUND ART

It is possible to cool a gas through heat exchange between a gas and a refrigerant. For instance, Patent Document 1 discloses cooling compressed air by exchanging heat between compressed air compressed by a compressor of a gas turbine and normal-temperature cooling air taken in from the outside, using a heat exchanger. In this heat exchanger, to suppress super-cooling or super-heating of compressed air to be cooled, the flow rate of compressed air flowing through the heat exchanger is adjusted.

CITATION LIST

Patent Literature

Patent Document 1: JP2015-152264A

SUMMARY

Problems to be Solved

Meanwhile, in a case where a gas is cooled with a heat exchanger, if the temperature of the refrigerant supplied to the heat exchanger is low, super-cooling is likely to occur, where the temperature of the gas to be cooled becomes not higher than a dew point. In particular, local super-cooling of the gas is likely to occur in the vicinity of the heat transfer surface of the heat exchanger, where heat is exchanged between the gas to be cooled and the refrigerant. If super-cooling occurs as described above, drain (condensate water) is produced from moisture in the gas to be cooled, and damage such as corrosion may develop on the pipe through which the gas flows.

In this regard, in the heat exchanger disclosed in Patent Document 1, super-cooling of compressed air is suppressed by adjusting the flow rate (heat load) of compressed air flowing through the heat exchanger. However, a specific configuration for preventing local super-cooling in the vicinity of the heat transfer surface is not disclosed.

In view of the above, an object of at least one embodiment of the present invention is to provide a heat exchange system and an operation method thereof, a cooling system and a cooling method of a gas turbine, and a gas turbine system, whereby it is possible to suppress generation of drain in a gas line through which a gas to be cooled flows.

Solution to the Problems (1) A heat exchange system includes: a gas line through which a gas to be cooled flows; a first heat exchanger disposed in the gas line and configured to cool the gas through heat exchange with a refrigerant; a refrigerant introduction line for introducing the refrigerant into the first heat exchanger; a refrigerant discharge line for discharging the refrigerant after cooling the gas from the first heat exchanger; a recirculation line for recirculating at least a part of the refrigerant flowing through the refrigerant discharge line into the refrigerant introduction line; and a flow-rate adjustment unit for adjusting a flow rate of the refrigerant flowing through the recirculation line so that a temperature of the refrigerant introduced into the first heat exchanger from the refrigerant introduction line is not lower than a threshold.

With the above configuration (1), by adjusting the flow rate (recirculation flow rate of the refrigerant) of the refrigerant having a high temperature returned to the refrigerant introduction line from the refrigerant discharge line via the recirculation line with the flow-rate adjustment unit, it is possible to maintain the temperature of the refrigerant flowing into the first heat exchanger to be not lower than a threshold. Accordingly, it is possible to prevent local super-cooling of gas in the vicinity of the heat transfer surface of the first heat exchanger, and suppress generation of drain in the gas line. Thus, it is possible to suppress pipe corrosion of the gas line.

(2) In some embodiments, in the above configuration (1), the flow-rate adjustment unit includes: a flow-rate adjustment valve disposed in the recirculation line; and a valve controller configured to control the flow-rate adjustment valve on the basis of a difference between the temperature of the refrigerant introduced into the first heat exchanger and a target temperature which is not lower than the threshold.

With the above configuration (2), by operating the flow-rate adjustment valve under control by the valve controller, for instance, on the basis of the difference between the temperature of the refrigerant flowing into the first heat exchanger and the target temperature, it is possible to adjust the temperature of the refrigerant flowing into the first heat exchanger appropriately and suppress generation of drain in the gas line effectively.

(3) In some embodiments, in the above configuration (1) or (2), the heat exchange system further includes a recirculation pump disposed in the recirculation line.

With the above configuration (3), by providing the recirculation pump in the recirculation line, it is possible to recirculate the refrigerant to the refrigerant introduction line even though the refrigerant introduction line has a higher pressure than the refrigerant discharge line corresponding to the pressure loss in the first heat exchanger.

(4) In some embodiments, in any one of the above configurations (1) to (3), the gas line is configured to supply compressed air to a cooling target part of the gas turbine from a compressor of a gas turbine.

With the above configuration (4), it is possible to cool compressed air generated by a compressor of a gas turbine with the first heat exchanger, and then supply the compressed air to the cooling target part of the gas turbine. Further, as described in the above (1), it is possible to suppress generation of drain in the gas line through function of the recirculation line and the flow-rate adjustment unit, and thus it is possible to prevent entry of drain into the gas turbine from the gas line and suppress efficiency deterioration of the gas turbine due to drain.

(5) In some embodiments, in the above configuration (4), the heat exchange system is configured such that the refrigerant introduction line is supplied with a part of condensate water from a condenser of a steam turbine which constitutes a GTCC together with the gas turbine.

With the above configuration (5), it is possible to cool compressed air through heat exchange utilizing condensate water. Further, it is possible to suppress generation of drain in the gas line through the function of the recirculation line and the flow-rate adjustment unit described in the above (1), unlike the case where condensate water having a relatively low temperature is supplied into the first heat exchanger as a refrigerant.

(6) In some embodiments, in the above configuration (4) or (5), the heat exchange system further includes a second heat exchanger disposed upstream of the first heat exchanger in the gas line.

With the above configuration (6), by using the first heat exchanger and the second heat exchanger upstream of the first heat exchanger, it is possible to gradually decrease the temperature of high-temperature compressed air from the gas-turbine compressor to a temperature region suitable to cool the cooling target part of the gas turbine. In this case, the risk of generation of drain in the gas line relatively increases in the first heat exchanger of the downstream side. Nevertheless, as described in the above (1), because of the function of the circulation line and the flow-rate adjustment unit, it is possible to suppress generation of drain in the gas line in the first heat exchanger.

(7) In some embodiments, in the above configuration (6), the second heat exchanger is configured to cool the gas by causing the gas to exchange heat with high-pressure supply water of a GTCC including the gas turbine.

With the above configuration (7), by cooling compressed air with high-pressure supply water in the second heat exchanger to recover thermal energy of high-temperature compressed air from the compressor of the gas turbine with high-pressure supply water, it is possible to improve the thermal efficiency of the GTCC.

(8) In some embodiments, in any one of the above configurations (1) to (7), the flow-rate adjustment unit is configured to adjust the flow rate of the refrigerant flowing through the recirculation line so as to satisfy a relationship $(T_d-15) \leq T \leq (T_d+5)$, where T [° C.] is a temperature of the refrigerant introduced into the first heat exchanger from the refrigerant introduction line and $T_d$ [° C.] is a dew point of the gas.

With the above configuration (8), by maintaining the temperature T of the refrigerant introduced into the first heat exchanger from the refrigerant introduction line within an appropriate temperature range, it is possible to exchange heat in the first heat exchanger while suppressing local generation of drain in the gas line.

(9) According to at least one embodiment of the present invention, a cooling system of a gas turbine includes: the heat exchange system according to any one of the above (1) to (8), configured to cool compressed air from a compressor of a gas turbine; and a cooling-air supply line for supplying the compressed air cooled by the heat exchange system to a cooling target part of the gas turbine.

With the above configuration (9), it is possible to cool compressed air generated by a compressor of a gas turbine with the heat exchange system, and then supply the compressed air to the cooling target part of the gas turbine. Further, as described in the above (1), it is possible to suppress generation of drain in the gas line through function of the recirculation line and the flow-rate adjustment unit, and thus it is possible to prevent entry of drain into the gas turbine from the gas line and suppress efficiency deterioration of the gas turbine due to drain.

(10) In some embodiments, in the above configuration (9), the cooling system of a gas turbine further includes an air compressor disposed in the cooling-air supply line.

With the above configuration (10), the pressure of compressed air cooled by the heat exchange system is increased by the air compressor, and thus it is possible to supply compressed air (cooling air) having a relatively low temperature to the cooling target part of the gas turbine smoothly.

(11) A gas turbine system according to at least one embodiment of the present invention includes: a gas turbine; and the cooling system according to the above (9) or (10) configured to cool the gas turbine.

With the above configuration (11), it is possible to cool compressed air generated by a compressor of a gas turbine with the heat exchange system, and then supply the compressed air to the cooling target part of the gas turbine. Further, as described in the above (1), it is possible to suppress generation of drain in the gas line through function of the recirculation line and the flow-rate adjustment unit, and thus it is possible to prevent entry of drain into the gas turbine from the gas line and suppress efficiency deterioration of the gas turbine due to drain.

(12) According to at least one embodiment of the present invention, a method of operating a heat exchange system includes: cooling a gas to be cooled through heat exchange with a refrigerant, in a first heat exchanger; and recirculating a part of the refrigerant from a refrigerant discharge line for discharging the refrigerant after cooling the gas from the first heat exchanger into a refrigerant introduction line for introducing the refrigerant to the first heat exchanger. The recirculating includes adjusting a flow rate of the refrigerant recirculated from the refrigerant discharge line to the refrigerant introduction line so that a temperature of the refrigerant introduced into the first heat exchanger from the refrigerant introduction line is not lower than a threshold.

According to the above method (12), by adjusting the flow rate (recirculation flow rate of the refrigerant) of the refrigerant having a high temperature returned to the refrigerant introduction line from the refrigerant discharge line, it is possible to maintain the temperature of the refrigerant flowing into the first heat exchanger to be not lower than a threshold. Accordingly, it is possible to prevent local supercooling of the gas in the vicinity of the heat transfer surface of the first heat exchanger, and suppress generation of drain in the gas line through which a gas to be cooled flows. Thus, it is possible to suppress pipe corrosion of the gas line.

(13) In some embodiments, in the above method (12), the recirculating includes adjusting the flow rate of the refrigerant to be recirculated to the refrigerant introduction line from the refrigerant discharge line so as to satisfy a relationship $(T_d-15) \leq T \leq (T_d+5)$, where T [° C.] is a temperature of the refrigerant introduced into the first heat exchanger from the refrigerant introduction line and $T_d$ [° C.] is a dew point of the gas.

According to the above method (13), by maintaining the temperature T of the refrigerant introduced into the first heat exchanger from the refrigerant introduction line within an appropriate temperature range, it is possible to exchange heat in the first heat exchanger while suppressing local generation of drain in the gas line through which the gas to be cooled flows.

(14) According to at least one embodiment of the present invention, a method of cooling a gas turbine includes: operating a heat exchange system by the method according to the above (12) or (13) and cooling compressed air from a compressor of a gas turbine; and supplying a cooling target part of the gas turbine with the compressed air cooled by the heat exchange system.

According to the above method (14), it is possible to cool compressed air generated by a compressor of a gas turbine with the heat exchange system, and then supply the compressed air to the cooling target part of the gas turbine.

Further, as described in the above (12), by adjusting the flow rate of the refrigerant to be circulated in the recirculating, it is possible to suppress generation of drain in the gas line through which the gas to be cooled flows. Thus, it is possible to prevent entry of drain into the gas turbine from the gas line and suppress efficiency deterioration of the gas turbine due to drain.

Advantageous Effects

According to at least one embodiment of the present invention, it is possible to provide a heat exchange system and an operation method thereof, a cooling system and a cooling method of a gas turbine, and a gas turbine system, whereby it is possible to suppress generation of drain in a gas line through which a gas to be cooled flows.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

Hereinafter, as an example of a gas turbine system to which a heat exchange system according to an embodiment is applied, a combined cycle power plant including a gas turbine will be described. Application of the heat exchange system according to the present invention is not limited to a combined-cycle power generation plant, and the heat exchange system can be also applied to a heat exchanger in general for cooling gas.

Figure 1:
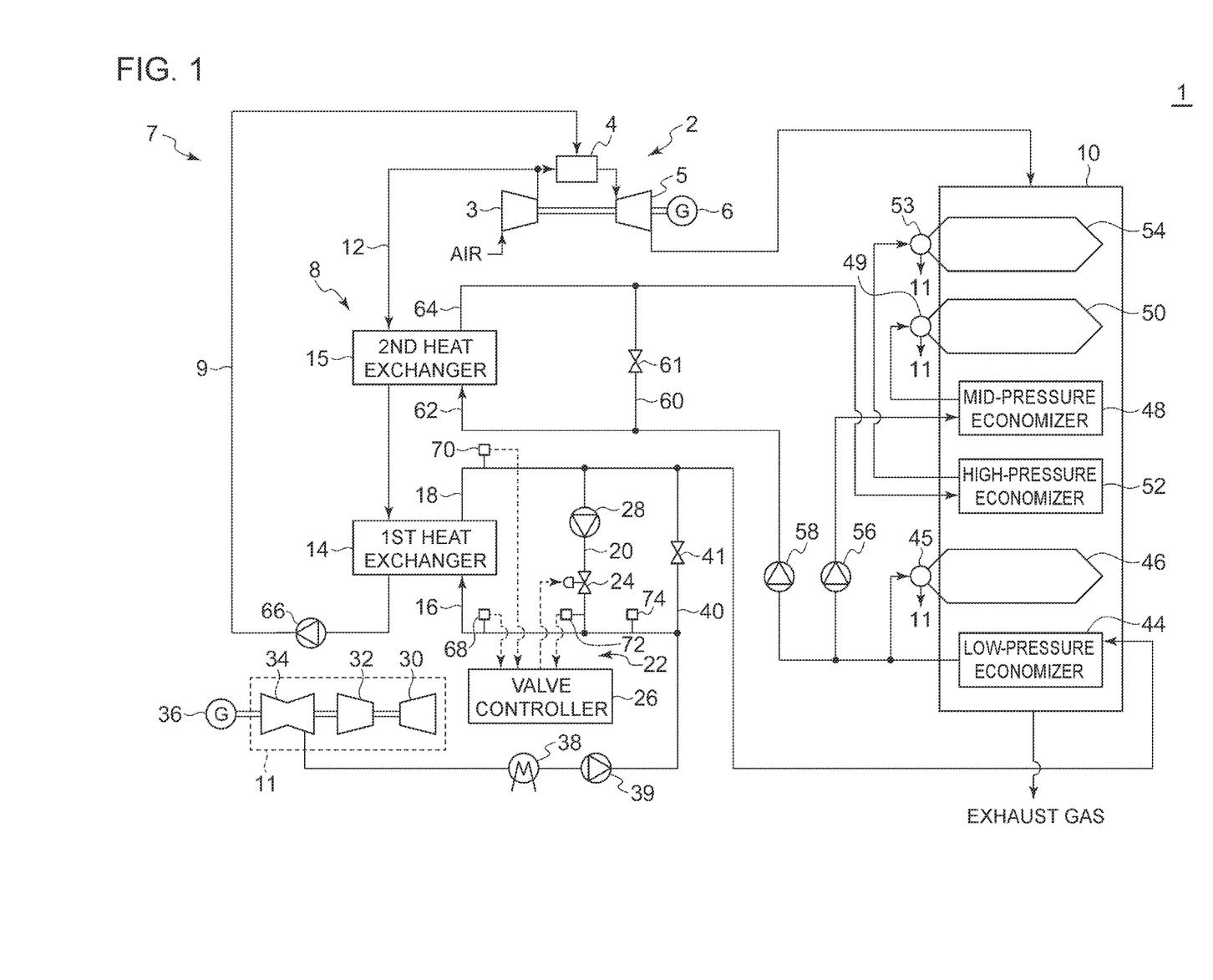
FIG. 1 is a configuration diagram of an overall configuration example of a gas turbine system according to an embodiment.

FIG. 1 is an overall configuration diagram of a combined cycle power generation plant including a gas turbine (hereinafter, referred to as GTCC power generation plant), which is a gas turbine system according to an embodiment. As shown in FIG. 1, the GTCC power generation plant 1 mainly includes a gas turbine 2, a steam turbine 11, a heat recovery steam generator 10, and a cooling system 7 for cooling the gas turbine 2.

Further, the GTCC power generation plant 1 may be a multi-axis type where rotors of the gas turbine 2 and the steam turbine 11 are independent from each other as shown in FIG. 1, or a single-axis type where the gas turbine 2 and the steam turbine 11 share a common rotor.

The gas turbine 2 includes a compressor 3 for compressing air, a combustor 4 for producing combustion gas by combusting a fuel (e.g. natural gas), and a turbine 5 configured to be rotary driven by combustion gas.

Compressed air compressed by the compressor 3 is sent into the combustor 4, and the combustor 4 is supplied with a fuel via another line (not depicted) different from the compressed air. Compressed air has a function as an oxidizing agent in combustion of a fuel in the combustor 4.

Combustion gas produced by combustion of a fuel in the combustor 4 is supplied to the turbine 5, and drives the turbine 5. A generator 6 is coupled to the turbine 5 via a rotational shaft. The generator 6 is driven by rotational energy of the turbine 5, and thereby electric power is generated.

Combustion gas (exhaust gas) discharged from the turbine 5 after performing work in the turbine 5 is guided to a heat recovery steam generator 10, utilized as a steam generation heat source in the heat recovery steam generator 10, and is discharged from a stack (not shown).

Further, a part of compressed air produced by the compressor 3 is guided to the cooling system 7 described below, and is used to cool the gas turbine 2 after being cooled by the heat exchange system 8 including a cooler (first heat exchanger 14 and/or second heat exchanger 15).

The heat recovery steam generator 10 includes a low-pressure economizer 44, a low-pressure evaporator 46, a mid-pressure economizer 48, a mid-pressure evaporator 50, a high-pressure economizer 52, and a high-pressure evaporator 54. Further, the low-pressure evaporator 46, the mid-pressure evaporator 50, and the high-pressure evaporator 54 include a low-pressure drum 45, a mid-pressure drum 49, and a high-pressure drum 53, respectively.

The steam turbine 11 includes a high-pressure turbine 30, a mid-pressure turbine 32, and a low-pressure turbine 34. The high-pressure turbine 30 is supplied with high-pressure steam obtained by super-heating saturated steam from the high-pressure drum 53 with a high-pressure super heater (not depicted) inside the heat recovery steam generator 10. The high-pressure steam supplied to the high-pressure turbine 30 is sent to a re-heater (not depicted) inside the heat recovery steam generator 10 after performing work in the high-pressure turbine 30.

The re-heater of the heat recovery steam generator 10 is also supplied with steam obtained by super-heating saturated steam from the mid-pressure drum 49 with a mid-pressure super heater in the heat recovery steam generator 10, in addition to high-pressure steam (low-temperature steam before re-heating) after performing work in the high-pressure turbine 30. Further, steam heated by the re-heater is supplied to the mid-pressure turbine 32 as re-heated steam. The re-heated steam supplied to the mid-pressure turbine 32 is supplied to the low-pressure turbine 34 after performing work in the mid-pressure turbine 32.

The low-pressure turbine 34 is also supplied with steam obtained by super-heating saturated steam from the low-pressure drum 45 with a low-pressure super heater (not depicted) inside the heat recovery steam generator 10, in addition to re-heated steam after performing work in the mid-pressure turbine 32.

A generator 36 is coupled to the high-pressure turbine 30, the mid-pressure turbine 32, and the low-pressure turbine 34 via rotational shafts. The generator 36 is driven by rotational energy of each turbine (30, 32, 34), and thereby electric power is generated.

Further, the gas turbine 2 and the steam turbine 11 may be configured to drive a common generator. That is, the generator 6 driven by the gas turbine 2 and the generator 36 driven by the steam turbine 11 may be the same generator.

Exhaust gas (steam) from the low-pressure turbine 34 is guided to the condenser 38 and condensed. Water generated in the condenser 38 is introduced into the low-pressure economizer 44 with a low-pressure supply water pump 39. A part of water after passing through the low-pressure economizer 44 is supplied to the low-pressure drum 45, and the remainder of the water is guided to the mid-pressure supply water pump 56 and the high-pressure supply water pump 58. The mid-pressure supply water pump 56 supplies mid-pressure supply water to the mid-pressure drum 49 via the mid-pressure economizer 48. Further, the high-pressure supply water pump 58 supplies high-pressure supply water to the high-pressure drum 53 via the high-pressure economizer 52. Supply water guided to the high-pressure drum 53, the mid-pressure drum 49, and the low-pressure drum 45 exchanges heat with exhaust gas from the turbine 5 of the gas turbine 2 and evaporates in the high-pressure evaporator 54, the mid-pressure evaporator 50, and the low-pressure evaporator 46, thereby accumulating as saturated steam in the respective drums (53, 49, 45).

The cooling system 7 is configured to cool the cooling target part (e.g. the combustor 4, or the rotor blade or the stationary vane of the turbine 5) of the gas turbine 2.

The cooling system 7 includes a heat exchange system 8 configured to cool compressed air from the compressor 3 of the gas turbine 2, and a cooling-air supply line 9 for supplying compressed air cooled by the heat exchange system 8 to the cooling target part of the gas turbine 2.

Further, in the example shown in FIG. 1, compressed air cooled by the heat exchange system 8 is supplied to the combustor 4 being the cooling target part via the cooling-air supply line 9. Nevertheless, the cooling target part is not limited to the combustor 4, and each component of the gas turbine 2 (e.g. rotor blade or stationary vane or the turbine 5) can be a cooling target part.

In the cooling-air supply line 9, an air compressor 66 for increasing the pressure of compressed air cooled by the heat exchange system 8 may be disposed. By increasing the pressure of the compressed air with the air compressor 66 cooled by the heat exchange system 8, it is possible to supply the cooling target part of the gas turbine 2 with compressed air (cooling air) having a relatively low temperature.

Next, the heat exchange system 8 according to some embodiments will be described in more detail.

In some embodiments, as depicted in FIG. 1, the heat exchange system 8 includes a gas line 12 through which a gas to be cooled flows, the first heat exchanger 14 disposed in the gas line 12, and a refrigerant introduction line 16 and a refrigerant discharge line 18 connected to the first heat exchanger 14. In an illustrative embodiment depicted in FIG. 1, the gas to be cooled is a part of compressed air generated in the compressor 3 of the gas turbine 2, and a part of compressed air is guided to the cooling system 7 via the gas line 12.

A refrigerant is introduced into the first heat exchanger 14 from the refrigerant introduction line 16, and the gas to be cooled is cooled through heat exchanged between the refrigerant and the gas to be cooled flowing through the gas line 12.

In the embodiment depicted in FIG. 1, condensate water obtained by condensing exhaust gas (steam) from the steam turbine 11 with the condenser 38 is introduced into the first heat exchanger 14 as a refrigerant. Further, in the first heat exchanger 14, compressed air is cooled through heat exchange between condensate water being a refrigerant and compressed air flowing through the gas line 12.

In the embodiment depicted in FIG. 1, a part of condensate water from the condenser 38 is supplied to the first heat exchanger 14 as a refrigerant, via the refrigerant introduction line 16. The remainder of condensate water from the condenser 38 is guided to the low-pressure economizer 44 not via the first heat exchanger 14, but via a condensate main flow line 40 disposed between the condenser 38 and the low-pressure economizer 44 of the heat recovery steam generator 10. That is, in the embodiment depicted in FIG. 1, the refrigerant introduction line 16 is branched from the condensate main flow line 40.

Further, the flow rate of condensate water as a refrigerant introduced into the first heat exchanger 14 via the refrigerant introduction line 16 may be adjusted by a valve 41 or the like disposed in the condensate main flow line 40, for instance.

Condensate water (refrigerant) introduced into the first heat exchanger 14 is discharged from the first heat exchanger 14 via the refrigerant discharge line 18 after cooling compressed air (gas to be cooled) through heat exchange in the first heat exchanger 14. The condensate water (refrigerant) discharged via the refrigerant discharge line 18 merges with condensate water flowing through the condensate main flow line 40, and is guided to the low-pressure economizer 44 of the heat recovery steam generator 10.

The heat exchange system 8 further includes a recirculation line 20 disposed between the refrigerant introduction line 16 and the refrigerant discharge line 18. The recirculation line 20 is configured to recirculate (return) a part of condensate water (refrigerant) flowing through the refrigerant discharge line 18 to the refrigerant introduction line 16.

Further, the heat exchange system 8 further includes a flow-rate adjustment unit 22 for adjusting the flow rate of condensate water (refrigerant) flowing through the recirculation line 20. In the embodiment depicted in FIG. 1, the flow-rate adjustment unit 22 includes a flow-rate adjustment valve 24 disposed in the recirculation line 20.

The flow-rate adjustment unit 22 is configured to adjust the flow rate of condensate water flowing through the recirculation line 20, so that the temperature of condensate water introduced into the first heat exchanger 14 from the refrigerant introduction line 16 is not lower than the threshold Ts. For instance, the opening degree of the flow-rate adjustment valve 24 is adjusted so that the temperature of condensate water introduced from the refrigerant introduction line 16 to the first heat exchanger 14 is not lower than the threshold Ts.

Figure 2:
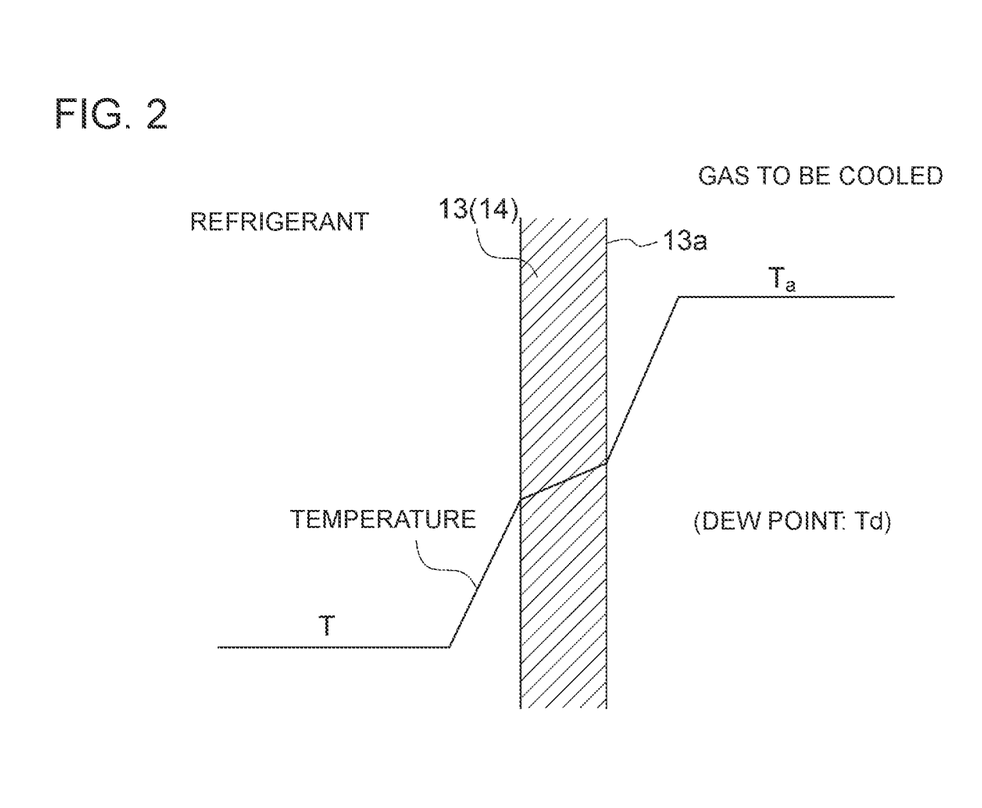
FIG. 2 is a diagram of an example of a temperature distribution in the vicinity of a heat-transfer tube constituting a heat exchanger.

FIG. 2 is a diagram of an example of a temperature distribution in the vicinity of a heat-transfer tube 13 constituting the first heat exchanger 14. In the example shown in FIG. 2, T is the temperature (bulk temperature) of the refrigerant (condensate water in the embodiment depicted in FIG. 1) introduced into the first heat exchanger 14, and Ta is the temperature (bulk temperature) of the gas to be cooled (compressed air in the embodiment depicted in FIG. 1) introduced into the first heat exchanger 14.

Typically, in the vicinity of the heat-transfer tube 13, the temperature distribution is as depicted in FIG. 2, depending on the temperature difference between the temperature T of the refrigerant and the temperature Ta of the gas to be cooled, and the heat-transfer coefficient of the refrigerant and the gas to be cooled. That is, the temperature gradient of the refrigerant and the gas to be cooled is steep in the vicinity of the heat transfer surface 13a (surface of heat transfer surface 13), and the temperature of the gas to be cooled decreases toward the heat transfer surface 13a. Herein, the lower the temperature T of the refrigerant, the lower the temperature of the gas to be cooled in the vicinity of the heat transfer surface 13a, and the gas is likely to be super-cooled locally in the vicinity of the heat transfer surface 13a. If super-cooling occurs as described above, drain (condensate moisture) is produced from moisture in the gas to be cooled, and damage such as corrosion may develop on the pipe through which gas flows.

In this regard, in the first heat exchanger 14 depicted in FIG. 1, condensate water being a refrigerant receives heat from heat exchange with compressed air. Thus, condensate water discharged to the refrigerant discharge line 18 from the first heat exchanger 14 has a higher temperature than condensate water flowing through the refrigerant introduction line 16.

Thus, by recirculating a part of condensate water (refrigerant) flowing through the refrigerant discharge line 18 to the refrigerant introduction line 16 via the recirculation line 20, it is possible to increase the temperature of condensate water (refrigerant) introduced into the first heat exchanger 14 from the refrigerant introduction line 16.

Further, by adjusting the flow rate (recirculation flow rate of the refrigerant) of condensate water having a high temperature returned to the refrigerant introduction line 16 from the refrigerant discharge line 18 via the recirculation line 20 with the flow-rate adjustment unit, it is possible to maintain the temperature of condensate water (refrigerant) flowing into the first heat exchanger 14 to be not lower than a threshold.

Thus, it is possible to prevent local super-cooling of gas in the vicinity of the heat transfer surface of the first heat exchanger 14, and suppress generation of drain in the gas line 12. Accordingly, it is possible to suppress pipe corrosion of the gas line 12.

In some embodiments, as depicted in FIG. 1, the flow-rate adjustment unit 22 may further include a valve controller 26 for controlling the flow-rate adjustment valve 24. Further, the flow-rate control in the flow-rate adjustment unit 22 by the valve controller 26 or the like will be described later.

A recirculation pump 28 may be disposed in the recirculation line 20. By providing the recirculation pump 28 in the recirculation line 20, it is possible to recirculate condensate water (refrigerant) to the refrigerant introduction line 16 even though the refrigerant introduction line 16 has a higher pressure than the refrigerant discharge line 18 corresponding to the pressure loss in the first heat exchanger 14.

In some embodiments, as depicted in FIG. 1, the heat exchange system 8 further includes a second heat exchanger 15 disposed upstream of the first heat exchanger 14 of the gas line 12.

In this case, by using the first heat exchanger (i.e. the second-stage cooler) and the second heat exchanger 15 (i.e. the first-stage cooler) upstream of the first heat exchanger 14, it is possible to gradually decrease the temperature of high-temperature compressed air from the compressor 3 of the gas turbine 2 to a temperature region suitable to cool the cooling target part (e.g. combustor 4) of the gas turbine 2.

As a refrigerant for cooling the gas to be cooled in the second heat exchanger 15 (compressed air generated by the compressor 3 of the gas turbine 2 in the embodiment depicted in FIG. 1), for instance, condensate water from the condenser 38, low-pressure supply water, mid-pressure supply water, or high-pressure supply water supplied to the low-pressure evaporator 46, the mid-pressure evaporator 50, or the high-pressure evaporator 54 of the heat recovery steam generator 10 may be used.

In an illustrative embodiment depicted in FIG. 1, the second heat exchanger 15 is configured to cool compressed air by causing high-pressure supply water in the GTCC power generation plant 1 and compressed air flowing through the gas line 12 to exchange heat.

As depicted in FIG. 1, high-pressure supply water from the high-pressure supply water pump 58 is guided to the high-pressure economizer 52 via the high-pressure supply water main flow line 60. Then, a part of high-pressure supply water from the high-pressure supply water pump 58 is supplied to the second heat exchanger 15 as a refrigerant, via a high-pressure supply water introduction line 62 branched from the high-pressure supply water main flow line 60.

The high-pressure supply water (refrigerant) having cooled the compressed air through heat exchange in the second heat exchanger 15 is discharged from the second heat exchanger 15 via the high-pressure supply water discharge line 64. The high-pressure supply water (refrigerant) discharged via the high-pressure supply water discharge line 64 merges with high-pressure supply water flowing through the high-pressure supply water main flow line 60, and is guided to the high-pressure economizer 52 of the heat recovery steam generator 10.

Further, the flow rate of high-pressure supply water as a refrigerant introduced into the second heat exchanger 15 via the high-pressure supply water introduction line 62 may be adjusted by a valve 61 or the like disposed in the high-pressure supply water main flow line 60, for instance.

Accordingly, by cooling compressed air with high-pressure supply water in the second heat exchanger 15 to recover thermal energy of high-temperature compressed air from the compressor 3 of the gas turbine 2 with high-pressure supply water, it is possible to improve the thermal efficiency of the GTCC power generation plant 1.

Next, in the heat exchange system 8, control of the flow rate (hereinafter, referred to as recirculation flow rate) of condensate water (refrigerant in the first heat exchanger 14) to be recirculated to the refrigerant introduction line 16 via the recirculation line 20 from the refrigerant discharge line 18 will be described.

Further, the control of the recirculation flow rate of the refrigerant may be performed by the flow-rate adjustment unit 22, or by controlling the opening degree of the flow-rate adjustment valve 24 with the valve controller 26.

In some embodiments, the recirculation flow rate of condensate water (refrigerant) is controlled on the basis of the difference between the temperature T of condensate water (refrigerant) introduced into the first heat exchanger 14 from the refrigerant introduction line 16 and the target temperature Tg which is not lower than the above described threshold Ts.

As described above, by operating the flow-rate adjustment valve under control by the valve controller, for instance, on the basis of the difference between the temperature T of condensate water (refrigerant) flowing into the first heat exchanger 14 and the target temperature Tg to adjust the recirculation flow rate, it is possible to adjust the temperature T of condensate water (refrigerant) flowing into the first heat exchanger 14 appropriately and suppress generation of drain in the gas line 12 effectively.

The recirculation flow rate of condensate water (refrigerant) may be adjusted such that the temperature of compressed air flowing through the gas line 12 (gas to be cooled) is higher than the dew point of the compressed air, on the heat transfer surface 13a (see FIG. 2) of the first heat exchanger 14.

Alternatively, in some embodiments, the recirculation flow rate of condensate water (refrigerant) is adjusted to satisfy a relationship $(T_d-15) \leq T \leq (T_d+5)$, where $T$ [° C.] is a temperature of the condensate water (refrigerant) introduced into the first heat exchanger 14 from the refrigerant introduction line 16 and $T_d$ [° C.] is a dew point of the compressed air flowing through the gas line 12 (gas to be cooled).

As described above, by maintaining the temperature T of condensate water (refrigerant) introduced into the first heat exchanger 14 from the refrigerant introduction line 16 within an appropriate temperature range, it is possible to exchange heat in the first heat exchanger 14 while suppressing local generation of drain in the gas line 12.

Further, the valve controller 26 is configured to control the above described recirculation flow rate on the basis of the detection result of the various sensors disposed in respective lines through which condensate water (refrigerant) flows.

In the illustrative embodiment depicted in FIG. 1, a temperature sensor 68 for detecting the temperature T of condensate water (refrigerant) introduced into the first heat exchanger 14 is disposed in the refrigerant introduction line 16, and a temperature sensor 70 for detecting the temperature of condensate water (refrigerant) discharged from the first heat exchanger 14 is disposed in the refrigerant discharge line 18. Further, a flow-rate sensor 72 for detecting the flow rate of condensate water (refrigerant) to be recirculated to the refrigerant introduction line 16 is disposed in the recirculation line 20. Furthermore, a flow-rate sensor 74 is disposed in the refrigerant introduction line 16. The flow-rate sensor 74 is configured to detect the flow rate of condensate water flowing into the refrigerant introduction line 16 as a refrigerant, of the condensate water from the condenser 38, at the downstream side of the branch point where the condensate main flow line 40 and the refrigerant introduction line 16 branch, and at the upstream side of the merge point where the recirculation line 20 merges with the refrigerant introduction line 16.

The valve controller 26 may be configured to control the recirculation flow rate of condensate water (refrigerant) on the basis of the detection result of at least one of the temperature sensor 68, the temperature sensor 70, the flow-rate sensor 72, or the flow-rate sensor 74.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

DESCRIPTION OF REFERENCE NUMERALS

1 GTCC power generation plant
2 Gas turbine
3 Compressor
4 Combustor
5 Turbine
6 Generator
7 Cooling system
8 Heat exchange system
9 Cooling-air supply line
10 Heat recovery steam generator
11 Steam turbine
12 Gas line
14 First heat exchanger
15 Second heat exchanger
16 Refrigerant introduction line
18 Refrigerant discharge line
20 Recirculation line
22 Flow-rate adjustment unit
24 Flow-rate adjustment valve
26 Valve controller
28 Recirculation pump
30 High-pressure turbine
32 Mid-pressure turbine
34 Low-pressure turbine
36 Generator
38 Condenser
39 Low-pressure supply water pump
40 Condensate main flow line
41 Valve
44 Low-pressure economizer
45 Low-pressure drum
46 Low-pressure evaporator
48 Mid-pressure economizer
49 Mid-pressure drum
50 Mid-pressure evaporator
52 High-pressure economizer
53 High-pressure drum
54 High-pressure evaporator
56 Mid-pressure supply water pump
58 High-pressure supply water pump
60 High-pressure supply water main flow line
61 Valve
62 High-pressure supply water introduction line
64 High-pressure supply water discharge line
66 Air compressor
68 Temperature sensor
70 Temperature sensor
72 Flow-rate sensor
74 Flow-rate sensor

The invention claimed is:

1. A heat exchange system, comprising: a gas line through which a gas to be cooled is to flow; a heat exchanger disposed in the gas line and configured to cool the gas through heat exchange with a refrigerant; a refrigerant introduction line for introducing the refrigerant into the heat exchanger; a refrigerant discharge line for discharging the refrigerant after cooling the gas from the heat exchanger; a recirculation line for recirculating at least a part of the refrigerant flowing through the refrigerant discharge line into the refrigerant introduction line; and a flow-rate adjustment unit programmed to adjust a flow rate of the refrigerant flowing through the recirculation line so that a temperature of the refrigerant introduced into the heat exchanger from the refrigerant introduction line is not lower than a threshold, wherein the gas line is configured to supply compressed air to a cooling target part of a gas turbine from a compressor of the gas turbine, wherein the refrigerant introduction line is configured to be supplied with a part of condensate water as the refrigerant from a condenser of a steam turbine which constitutes a gas turbine combined cycle (GTCC) together with the gas turbine, the refrigerant introduction line is branched from a condensate main flow line disposed between the condenser and a boiler constituting the GTCC, the refrigerant discharge line joins the condensate main flow line, wherein the refrigerant discharge line joins the condensate main flow line at a joining position disposed downstream of a branching position at which the refrigerant introduction line branches, and the heat exchange system further comprises a valve which is capable of adjusting a flow rate of the condensate water flowing through a part of the condensate main flow line, the part of the condensate main flow line being disposed downstream of the branching position of the refrigerant introduction line and upstream of the joining position of the refrigerant discharge line.

2. The heat exchange system according to claim 1, wherein the flow-rate adjustment unit includes:
   a flow-rate adjustment valve disposed in the recirculation line; and
   a valve controller configured to control the flow-rate adjustment valve based on a difference between the temperature of the refrigerant introduced into the heat exchanger and a target temperature which is not lower than the threshold.

3. The heat exchange system according to claim 1, further comprising
   a recirculation pump disposed in the recirculation line.

4. The heat exchange system according to claim 1, wherein:
   the heat exchanger is a first heat exchanger; and
   the heat exchange system further comprises a second heat exchanger disposed upstream of the first heat exchanger in the gas line.

5. The heat exchange system according to claim 4, wherein the second heat exchanger is configured to cool the gas by causing the gas to exchange heat with high-pressure supply water of a gas turbine combined cycle (GTCC) including the gas turbine.

6. The heat exchange system according to claim 1, wherein the flow-rate adjustment unit is configured to adjust the flow rate of the refrigerant flowing through the recirculation line so as to satisfy a relationship $(T_d-15) \leq T \leq (T_d+5)$, where T [° C.] is the temperature of the refrigerant introduced into the heat exchanger from the refrigerant introduction line and $T_d$[° C.] is a dew point of the gas.

7. A cooling system of a gas turbine, the cooling system comprising:
   the heat exchange system according to claim 1, the heat exchange system being configured to cool the compressed air from the compressor of the gas turbine; and
   a cooling-air supply line for supplying the compressed air cooled by the heat exchange system to the cooling target part of the gas turbine.

8. The cooling system according to claim 7, further comprising
   an air compressor disposed in the cooling-air supply line.

9. A gas turbine system, comprising:
   a gas turbine; and
   the cooling system according to claim 7,
   wherein the cooling system is configured to cool the gas turbine.

10. A method of cooling a gas turbine using the heat exchange system according to claim 1, the method comprising:
    operating the heat exchange system and cooling the compressed air from the compressor of the gas turbine; and
    supplying the cooling target part of the gas turbine with the compressed air cooled by the heat exchange system,
    wherein the operating includes:
    cooling the compressed air from the compressor of the gas turbine through heat exchange with the refrigerant, in the heat exchanger; and
    recirculating at least the part of the refrigerant from the refrigerant discharge line into the refrigerant introduction line, and
    wherein the recirculating includes using the flow-rate adjustment unit to adjust the flow rate of the refrigerant recirculated from the refrigerant discharge line to the refrigerant introduction line so that the temperature of the refrigerant introduced into the heat exchanger from the refrigerant introduction line is not lower than the threshold.

11. The method according to claim 10,
    wherein the recirculating includes adjusting the flow rate of the refrigerant to be recirculated from the refrigerant discharge line to the refrigerant introduction line so as to satisfy a relationship $(T_d-15) \leq T \leq (T_d+5)$, where T[° C.] is the temperature of the refrigerant introduced into the first heat exchanger from the refrigerant introduction line and $T_d$[° C.] is a dew point of the compressed air.

12. The heat exchange system according to claim 1, wherein the refrigerant discharge line joins the condensate main flow line at a joining position disposed downstream of a branching position at which the refrigerant introduction line branches and upstream of a low-pressure economizer of the GTCC.

* * * * *